US011086550B1

United States Patent
Palanichamy et al.

(10) Patent No.: US 11,086,550 B1
(45) Date of Patent: Aug. 10, 2021

(54) TRANSFORMING DARK DATA (71) Applicant: EMC Corporation, Hopkinton, MA (US)

(72) Inventors: Janarthanan Palanichamy, Dindigul (IN); Sairam Veeraswamy, Coimbatore (IN); George Asirvatharaj, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1176 days.

(21) Appl. No.: 14/985,612

(22) Filed: Dec. 31, 2015

(51) Int. Cl.
*G06F 17/00* (2019.01)
*G06F 3/06* (2006.01)
*G06F 12/0802* (2016.01)
*G06F 16/2455* (2019.01)

(52) U.S. Cl.
CPC ............ *G06F 3/065* (2013.01); *G06F 3/0604* (2013.01); *G06F 3/0644* (2013.01); *G06F 3/0683* (2013.01); *G06F 12/0802* (2013.01); *G06F 16/2455* (2019.01); *G06F 2212/60* (2013.01)

(58) Field of Classification Search
None
See application file for complete search history.

(56) References Cited

U.S. PATENT DOCUMENTS

| 9,430,290 B1* | 8/2016 | Gupta | G06F 9/5016 |
| 2010/0281488 A1* | 11/2010 | Krishnamurthy | G06F 11/3495 718/106 |
| 2016/0048408 A1* | 2/2016 | Madhu | G06F 11/2023 718/1 |
| 2016/0342542 A1* | 11/2016 | Voigt | G06F 3/06 |

OTHER PUBLICATIONS

Dick Pountain, The Penguin Concise Dictionary of Computing 109 (2003).*
EMC Federated Tiered Storage (FTS) Allows Seamless Integration Between EMC Symmetrix VMAX Series and Third-Party Storage Arrays, EMC Corp. White Paper (2012).*
Just What the Heck is Geometry Limited on VMAX FTS?, raid-zero.com (May 7, 2014).*
EMC Symmetrix Federated Tiered Storage Introduction, Dell Community, www.dell.com (Mar. 11, 2015).*

* cited by examiner

*Primary Examiner* — Tuankhanh D Phan
(74) *Attorney, Agent, or Firm* — Anderson Gorecki LLP (57) ABSTRACT

A computing node of a data storage system includes a data transform component. The data transform component identifies data that is maintained by the storage system and has a particular data structure. The data transform component may also perform analytics on the data based on the data structure. For example, different data sets that are dependent, e.g. related via association with the same application or type of application, or which are typically accessed in temporal proximity, can be discovered based on data structure and analytics. Data relationships may be used to prepare dependent data for access in advance of an IO associated with that dependent data.

19 Claims, 7 Drawing Sheets

TRANSFORMING DARK DATA

BACKGROUND

The subject matter of this disclosure is generally related to data storage systems that can be used to maintain large data sets and support multiple concurrent users. The basic building blocks of such a data storage system may include computing nodes that manage access to pools of data storage devices such as disk drives and flash drives. For example, the computing nodes may present a logical volume of storage which is backed by the data storage devices. The data storage system may be accessed by, or via, a host device. For example, instances of an application running on a host device may access data, or applications running on other devices may prompt data access by sending IOs to the host device. The host device accesses data by communicating with the storage system with reference to the logical volume.

SUMMARY

All examples, aspects and features mentioned in this document can be combined in any technically possible way.

In accordance with an aspect an apparatus comprises: a data storage system comprising: at least one computing node comprising a processor and a non-transitory memory; a plurality of data storage devices; and a data transform component running on the computing node, the data transform component comprising program code that identifies a structure of data that is in the memory and, based on the structure, locates dependent data in the storage devices and causes the located dependent data to be copied into the memory. In some implementations the data transform component comprises a database. In some implementations the data transform component comprises program code that locates dependent data in the storage devices for structures indicated by a policy. In some implementations the data transform component delays destaging of the data from the memory while the dependent data is located and destages the data if the dependent data cannot be fetched. In some implementations the data transform component transforms the dependent data and combines the transformed dependent data with other data to provide analytics-ready data. In some implementations the data transform component copies the dependent data from an external storage device or a remote storage cluster associated with federated tiered storage into the memory or local cache of a computing node until space is available in memory. In some implementations the data transform component provides a hint to prompt promotion of the dependent data to a higher performing tier of storage including cache. In some implementations the data transform component prevents copying of the dependent data into the memory if doing so would cause a failure to achieve service level objectives. In some implementations the data transform component copies the dependent data to flash if free capacity in the memory is insufficient. In some implementations the data transform component uses data relationships to prepare dependent data for access in advance of an IO associated with that dependent data. In some implementations the located dependent data is only copied into the memory if doing so will not compromise achievement of service level objectives. In some implementations the apparatus comprises user-configurable policies that indicate data of interest and identify dependent data.

In accordance with an aspect a method comprises: in a data storage system comprising a plurality of data storage devices and at least one computing node comprising a processor and a memory: identifying a structure of data that is in the memory; based on the structure, locating dependent data in the storage devices; and copying the located dependent data into the memory. In some implementations the method comprises using a database to identify the structure of the data. In some implementations the method comprises locating the dependent data and copying it to cache from external or internal storage devices for structures indicated by a policy. In some implementations the method comprises delaying destaging of the data while the dependent data is located and destaging if the dependent data cannot be fetched. In some implementations the method comprises transforming the dependent data. In some implementations the method comprises providing a hint to prompt promotion of the dependent data to a higher performing tier of storage. In some implementations the method comprises preventing copying of the dependent data into the memory if doing so would cause a failure to achieve service level objectives. In some implementations the method comprises copying the dependent data to flash rather than the memory if free capacity in the memory is insufficient.

DETAILED DESCRIPTION

Some aspects, features and implementations described herein may comprise computer devices, components and computer-implemented steps or processes. It should be apparent to those of ordinary skill in the art that the computer-implemented steps or processes may be stored as computer-executable instructions on a non-transitory computer-readable medium. Furthermore, it should be understood by those of ordinary skill in the art that the computer-executable instructions may be executed on a variety of tangible processor devices. For ease of exposition, not every step, process or element is described herein as part of a computer system. Those of ordinary skill in the art will recognize steps, processes and elements that may have a corresponding computer system or software component. Such computer system and software components are therefore enabled by describing their corresponding steps, processes or elements, and are within the scope of the disclosure.

The terminology used in this description is intended to be interpreted broadly within the limits of subject matter eligibility. The terms "logical" and "virtual" are used to refer to devices and components that are abstractions of real devices. For example, multiple virtual computing devices could operate simultaneously on one real computing device. A "host application" is an application that accesses a storage service from a storage system via a storage network, e.g. and without limitation via a standard protocol such as SCSI (small computer system interface). A "volume" is a logical unit presented by a storage system for use by host applications. The storage system manages the underlying physical resources used to implement the storage services for a volume. A "data device" is an entity that is internal to a storage system, and which is used to manage access to storage resources that the storage system uses to deliver storage services. A data device may be internal, in which case it refers to storage that is local to the first storage system, or external, in which case the data device derives from a logical volume that is presented from a second storage system to the first storage system. A "storage resource pool" is a collection of data devices. An "internal storage resource pool" is a storage resource pool of internal data devices. An "external storage resource pool" is a storage resource pool of external data devices. A "performance tier" is a collection of data devices that are classified as either having a similar performance profile, or as collectively implementing storage service with a particular performance profile.

Figure 1:
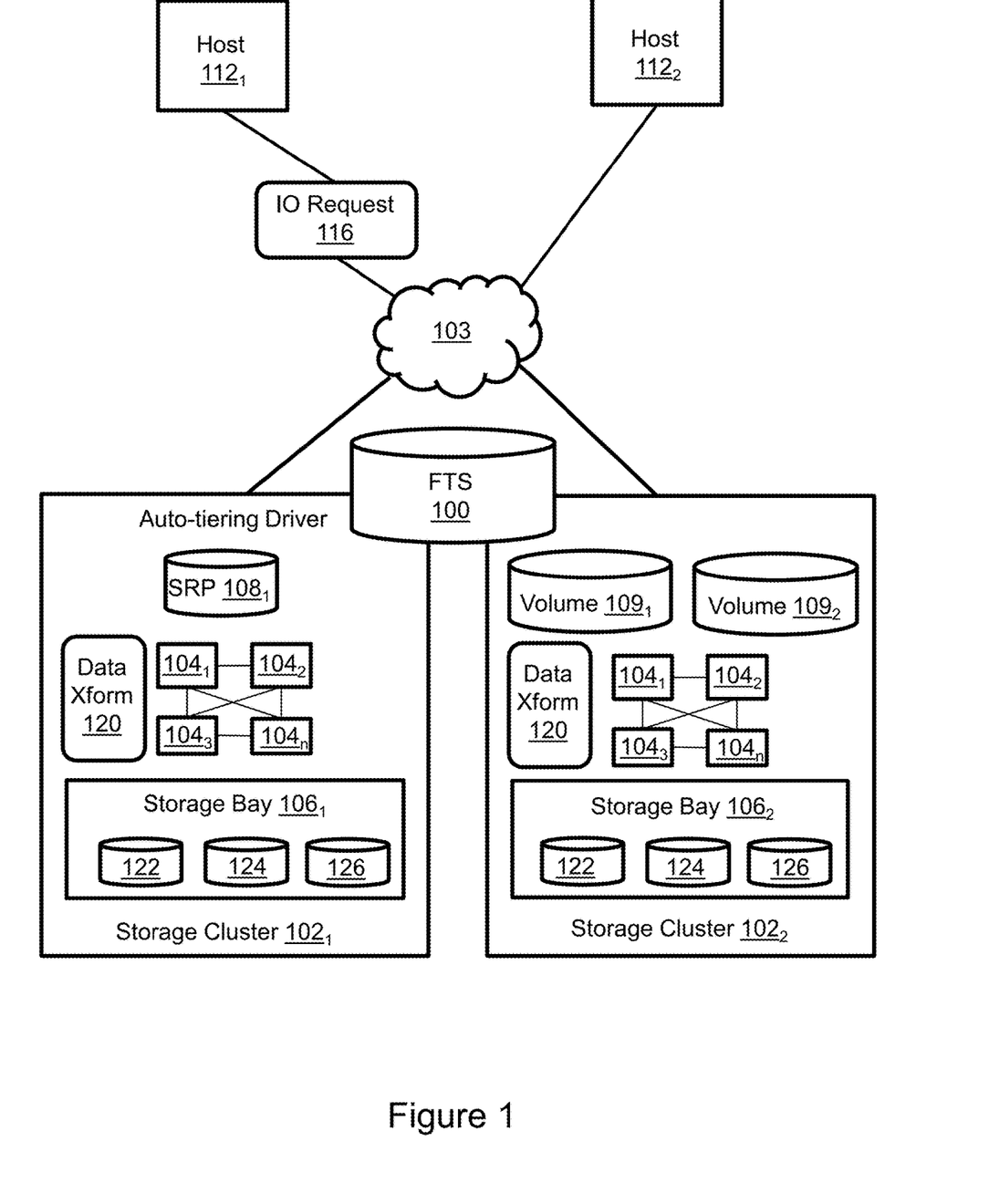
FIG. 1 illustrates a distributed data storage system with federated tiered storage.

FIG. 1 illustrates a distributed data storage system with FTS (federated tiered storage). FTS 100 is storage space having multiple performance tiers, and for which the underlying storage devices and data are distributed across multiple data storage systems. An individual data storage system may include a cluster, data center or storage array, for example and without limitation. Auto-tiering of the FTS is driven by one of the data storage systems. The illustrated distributed data storage system includes storage clusters $102_1$, $102_2$ that are interconnected via a network 103, and storage cluster $102_1$ is the FTS auto-tiering driver. For context and without limitation the network 103 could be a WAN (wide area network) or MAN (metropolitan area network). Each storage cluster $102_1$, $102_2$ includes one or more computing nodes $104_1$-$104_n$ and an associated storage bay $106_1$, $106_2$, respectively. The computing nodes may include specialized storage engine hardware platforms or "vanilla" storage servers, for example and without limitation. The storage bay may include storage devices of various different technology types, e.g. and without limitation flash drives 122, 15 k disk drives 124 and 7 k disk drives 126. Within each cluster, each storage engine is connected to every other storage engine via point-to-point links of an interconnecting fabric.

Figure 2:
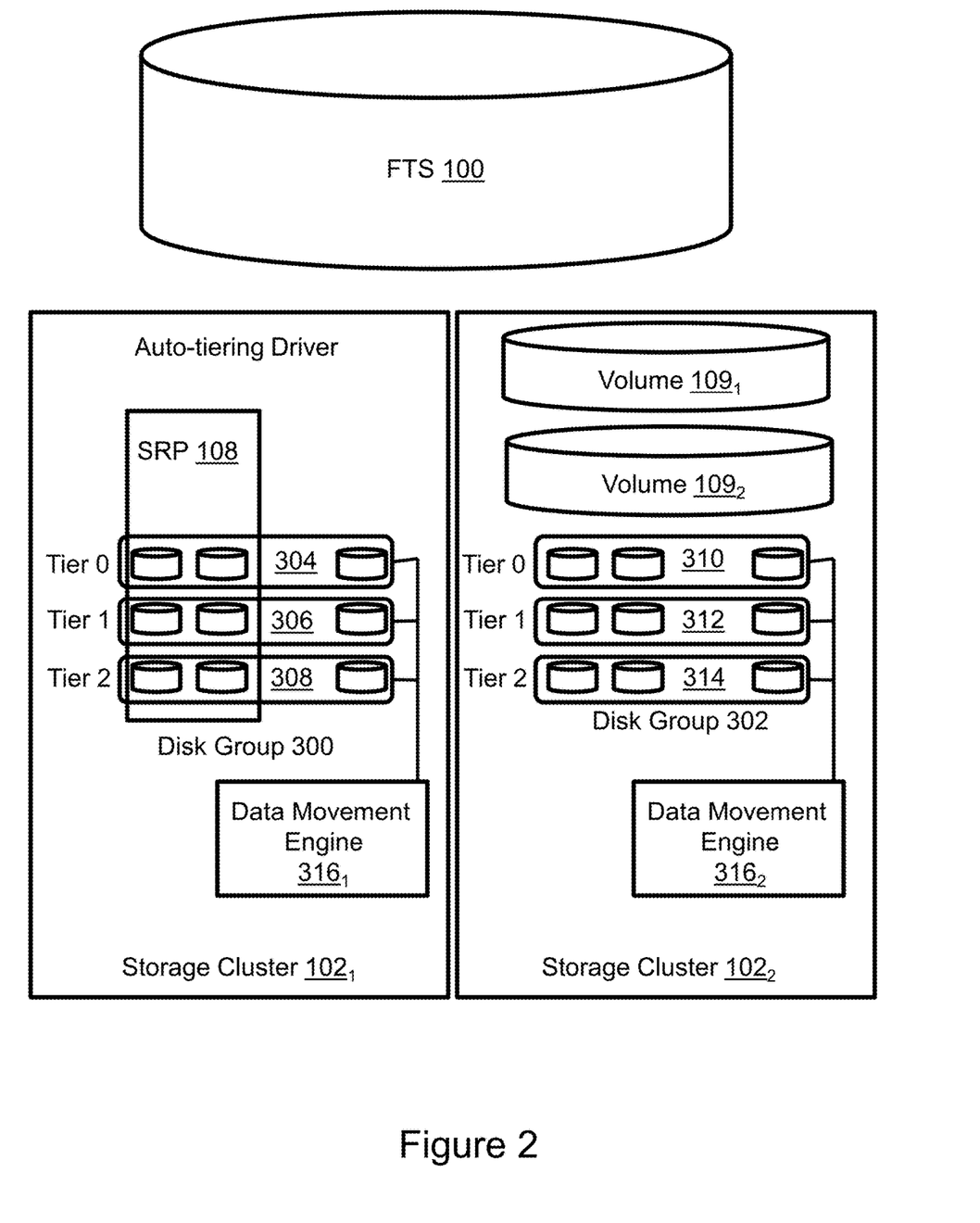
FIG. 2 illustrates organization of storage resources of the distributed data storage system.

Referring to FIGS. 1 and 2, FTS 100 includes storage resources of SRP (storage resource pool) 108 in cluster $102_1$ and volumes $109_1$, $109_2$ presented by cluster $102_2$. SRP 108 includes some or all storage resources of disk group 300 of storage cluster $102_1$. Volumes $109_1$, $109_2$ are logical representations of some or all storage resources of disk group 302 of storage cluster $102_2$. The volumes are presented to the FTS auto-tiering driver, i.e. storage cluster $102_1$ in the illustrated example. Each disk group 300, 302 includes one or more pools of data storage devices. In the illustrated example disk group 300 includes pools 304, 306, 308 at tier 0, tier 1 and tier 2, respectively, and disk group 302 includes pools 310, 312, 314 at tier 0, tier 1 and tier 2, respectively. The tier numbers correspond to levels of performance of storage devices in a particular pool. For example and without limitation, devices of the same technology type may be in each pool. Purely for context and without limitation tier 0 may include flash drives, tier 1 may include 15 k rpm disk drives and tier 2 may include 7 k rpm disk drives. The auto-tiering driver is aware of the tiers with which the storage resources allocated to SRP 108 are associated because those storage resources are local. However, the auto-tiering driver has limited information about volumes $109_1$, $109_2$ because those volumes are backed by external devices. For example, the auto-tiering driver may initially only know the volume IDs, volume sizes and address ranges. In an extreme example FTS 100 may include only volumes backed by external devices. Further complicating the scenario, data movement engines $316_1$, $316_2$ at storage clusters $102_1$, $102_2$ respectively may perform independent tiering decisions so auto-tiering driver cluster $102_1$ does not determine or have knowledge of the tier on which an extent of data is stored by SRP $108_2$. For example, data movement engine $316_2$ independently promotes and demotes extents of data between tiers based on frequency of access and hints so an extent on FTS 100 may be moved between tiers in cluster $102_2$ without any indication being provided to cluster $102_1$. One or both storage clusters may also present other logical storage volumes so the data associated with those other volumes may be included in tiering decisions made by the data movement engines and also contribute to TOPS loading and capacity utilization of the storage devices associated with volumes $109_1$, $109_2$. Thus, the level of performance, e.g. in terms of response time, that might be expected when accessing the external volumes associated with FTS 100 is generally unknown to, and beyond the control of, auto-tiering driver storage cluster $102_1$. This complicates associating storage resources of FTS 100 with specific tiers.

Referring again to FIG. 1, each storage cluster $102_1$, $102_2$ includes at least one data transform component 120. The data transform component functions within the storage system to identify data that is maintained by the storage system and has a particular data structure. Further, the data transform component may read stored data via a decoder to perform various actions and drive analytics. The data transform component may perform analytics on the data based on the data structure. For example, different data sets that are dependent, e.g. related via association with the same application or type of application, or which are typically accessed in temporal proximity, can be discovered based on data structure and analytics. Data relationships may be used to prepare dependent data for access in advance of an TO associated with that dependent data. For example, an TO associated with a first set of data may prompt promotion of a second related set of data from local storage to cache or a higher performance tier of storage. Further, remotely stored data associated with FTS may be copied from a remote storage cluster to local cache of a computing node. The data may be further prepared by performing data transformation to create application-usable data from raw data. For example, dependent data on volumes $109_1$, $109_2$ may be copied to cluster $102_1$ in preparation for expected IOs. Analytics-related data may be temporarily de-staged, e.g. to flash drives, and subsequently brought back into cache for analytic processing. For example, if cache resources are needed for higher priority data then analytics-related data may be temporarily de-staged until sufficient free cache resources become available. These and other features are described below.

Figure 3:
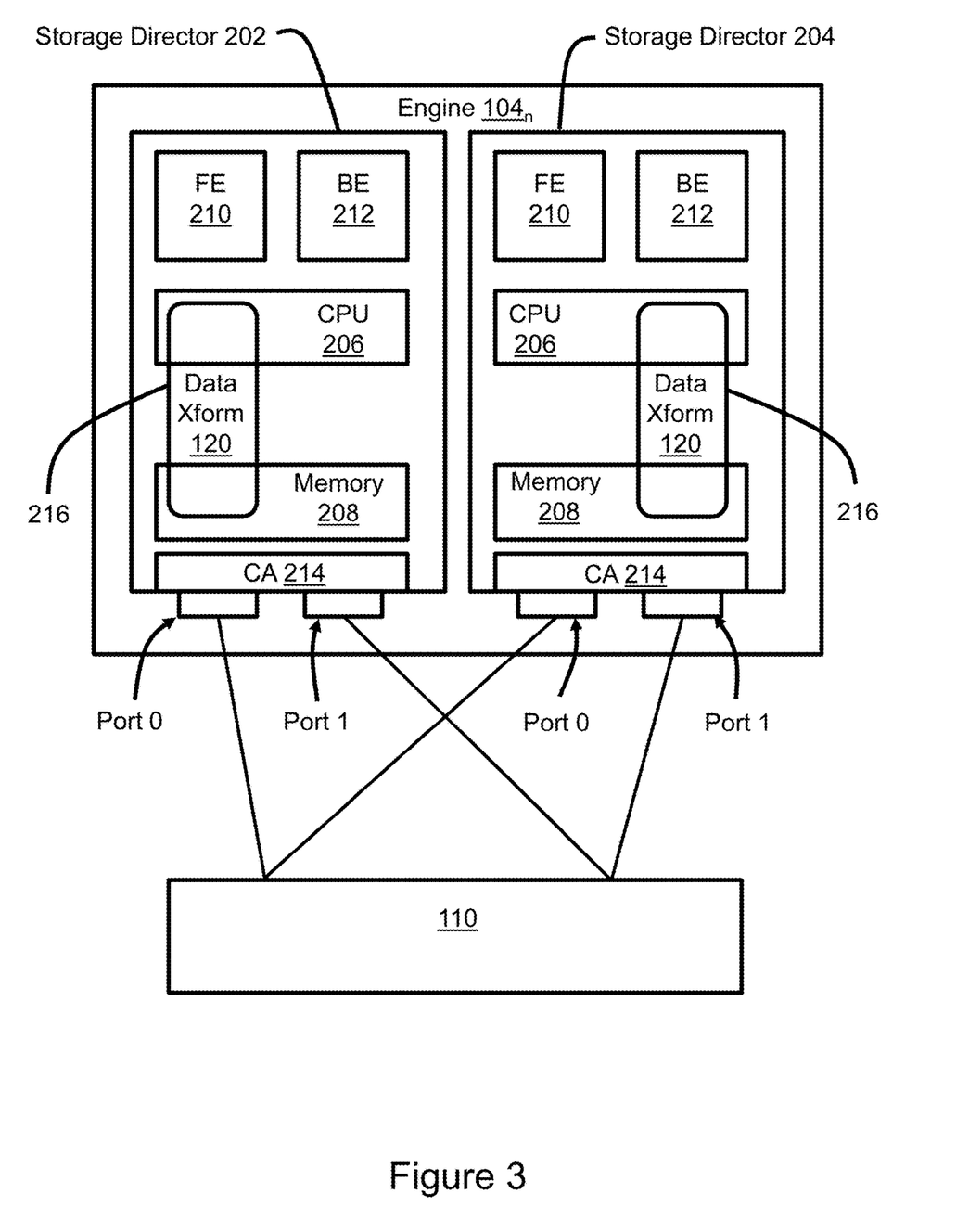
FIG. 3 illustrates a storage engine of the distributed data storage system in greater detail.

FIG. 3 illustrates an implementation of an exemplary storage engine $104_n$ in greater detail. In the illustrated example the storage engine includes two storage directors 202, 204. Each storage director includes a multi-core CPU 206, a cache of volatile memory 208, a front end module 210, a back end module 212, and a channel adapter 214, all of which may be on a single printed circuit board blade. The front end module 210 is configured to interface with the host devices $112_1$, $112_2$ (FIG. 1). For example, the front end module presents a logical volume to the host devices, receives IO requests from host application instances running on the host devices, and provides data to the host application instances in response to read requests. The back end module 212 interfaces with back end physical storage devices in the storage bay. For example, the back end module reads data from and writes data to the back end storage devices. The CPU 206 runs a variety of programs configured to cause the director to perform IOs and other functions related to maintenance, protection and availability of data. Each channel adapter 214 includes two ports, Port 0 and Port 1. The two ports correspond to two switches of the fabric that provides redundant point-to-point connectivity between engines and directors. The memory 208, which may include volatile memory components such as RAM (random access memory) chips for example and without limitation, includes a cache slots section which is allocated for temporarily storing data that is being written to or read from the back end storage devices. For example, data that is being written by a host device is initially copied to the cache slots section of memory 208 and subsequently de-staged to the back end storage devices. Data that is being read by a host device is copied from the back end storage devices to memory 208 via the back-end module and then provided to the host. Data may be also copied to the cache slots from the back end storage devices in response to a hint.

Figure 4:
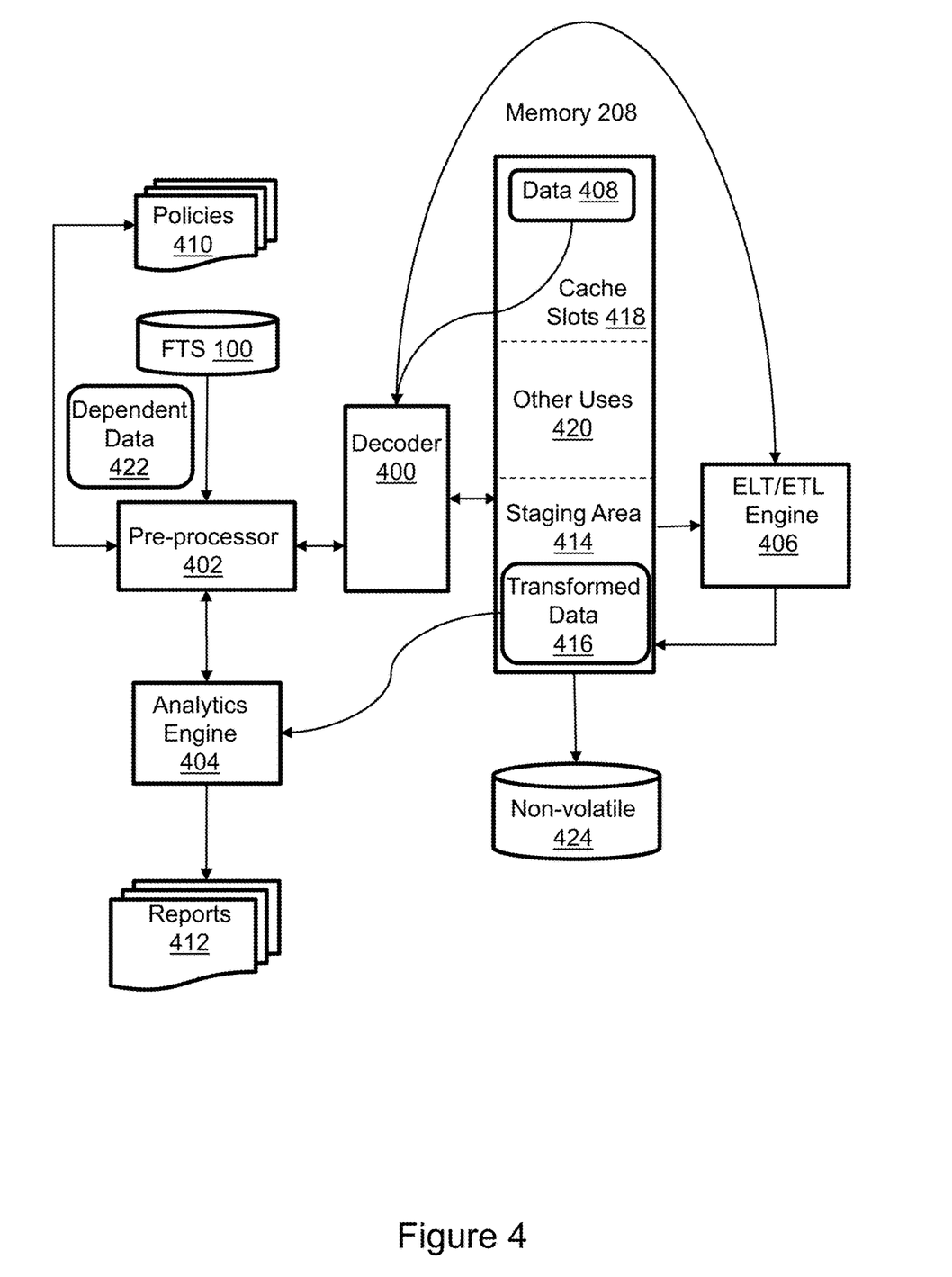
FIG. 4 illustrates an instance of the data transform component running in a container.

Referring to FIGS. 3 and 4, a hypervisor or container may be used to provide hardware-based or operating system-based virtualization for programs such data transform component 120, e.g. each storage director 202, 204 may include an instance of the data transform component 120 running in a container 216. Each data transform component instance understands the structure of data using decoders, and performs other actions including but not limited to data pinning (in cache) and FAST (fully automated storage tiering) hinting. Each data transform component instance discovers relationships between data 408 in a cache slots area 418 of memory 208 and other dependent data 422. The data transform component may also prompt other actions to make that data 408 and the dependent related data 422 more usable and readily available for access from cache or higher performance storage. The hypervisor could include virtual machines having allocated cores of CPU 206 and allocated space of portion 420 of memory 208. In the illustrated implementation each data transform component instance includes a decoder 400, a pre-processor 402, an analytics engine 404, and an ELT (Extract/Load/Transform) or ETL (Extract/Transform/Load) (hereafter ELT/ETL) engine 406.

Figure 5:
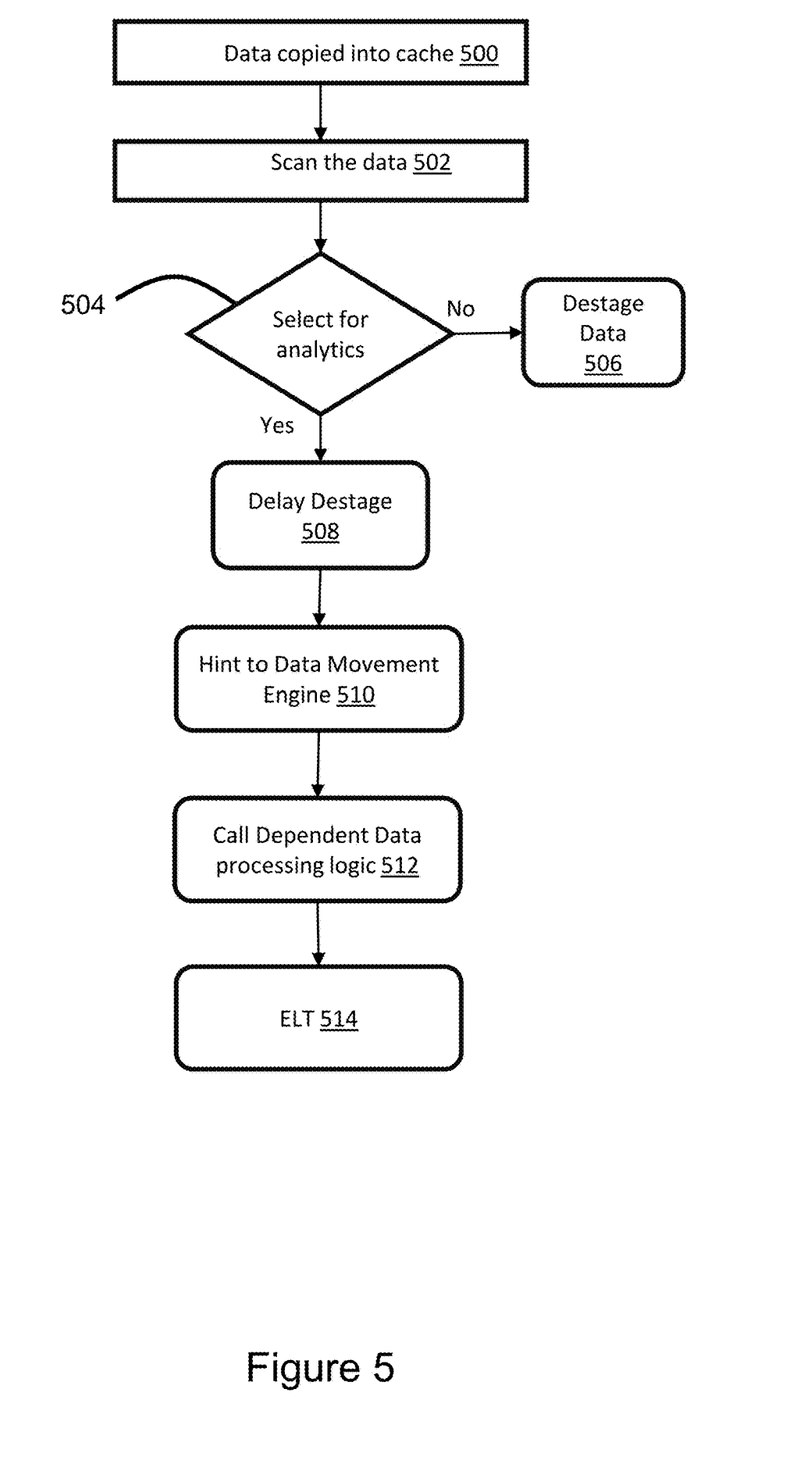
FIG. 5 through 7 illustrate aspects of operation of the data transform component.

Referring to FIGS. 4 and 5, processing by the data transform component commences when, as indicated at 500, the data 408 is copied into the memory 208 of the storage director as part of a transaction. More particularly, when the data 408 is copied into the cache slots 418 processing by the data transform component commences. The data may be copied into cache slots 418 for any of a variety of reasons. For example, data may be copied into the cache slots from a local or remote storage pool of FTS 100 in response to a read request from a host. Further, data may be copied into the cache slots in response to a write request from a host. Further, data may be copied into the cache slots as part of an operation that does not involve the host. As indicated at 502, the decoder 400 scans the data 408 to determine whether the data has a known structure. The decoder 400 may include a DB (database) that recognizes one or more data structures. If the data 408 has a known structure then the decoder 400 sends the address of the data 408 and a structure identifier to the pre-processor 402. The decoder may be configurable, e.g. by users via DB records, to recognize specific structures and notify the pre-processor. The pre-processor may also be user-configured, e.g. by adjusting policies 410. If the structure matches what the users have configured via the policies as being of interest to analytics then the pre-processor informs the system that the data is of interest.

As indicated at 504, the pre-processor determines whether to invoke the analytics engine 404 in accordance with policies 410. For example, the policies 410 may indicate for which specific types of recognizable data structures the analytics engine is to be invoked. Again, users can configure those policies. If the decision is made to not invoke the analytics engine then the data 408 is de-staged from cache slots 418 normally as indicated at 506. If the decision is made to invoke the analytics engine then destaging is delayed as indicated at 508. However, delayed destaging may be implemented subject to availability of free space in the memory. For example, if delayed destaging would compromise the ability of the storage system to satisfy SLOs then delayed destaging may be postponed or cancelled. Delayed destaging of the data 408 may be implemented by moving the data 408 into a staging area 414 of memory 208. The staging area may include a portion of the memory that is dynamically resized in accordance with other requirements of the data storage system. The analytics engine 404, once invoked, may prompt a variety of other processes, e.g. and without limitation a variety of standard analytics engine features and various non-standard analytics engine processes described herein.

The analytics engine may provide a hint to the data movement engine as indicated at 510. For example, the hint may indicate that dependent data 422 should be promoted or demoted between tiers of FTS 100 or other storage. The analytics engine may call dependent data processing logic of the pre-processor as indicated at 512. For example, related dependent data 422 may be copied from FTS 100 or other storage into the staging area 414 of memory 208. As indicated at 514, the analytics engine may also prompt the ELT/ETL engine to transform the data 408 and dependent data 422 into transformed data 416 which is stored in the staging area of the memory 208. Raw data is transformed by a function which changes the raw data in some way, e.g. and without limitation in ways dictated by the pro-processor and analytics engine in accordance with the policies 410. Simple examples of transforming functions may include mathematical operations such logarithmic functions and exponent (power transform) functions including but not limited to square root, cube root, square and cube functions. A very wide variety of mathematical, logical and other functions may be used to transform raw data into transformed data in order to provide application data. The analytics engine processes the transformed data 416 to generate reports 412.

Figure 6:
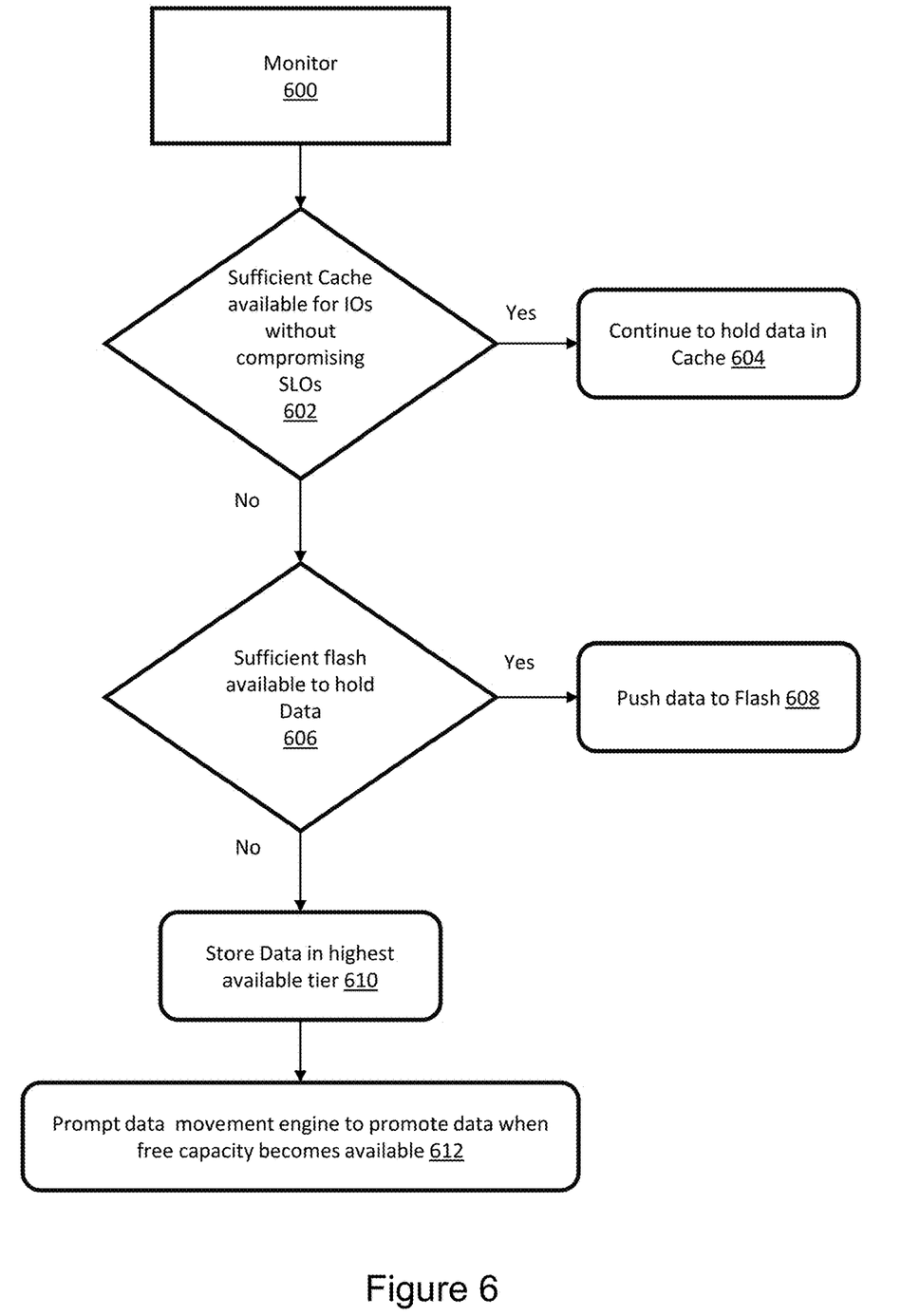

FIG. 6 illustrates memory management and hinting. Performance and free capacity are monitored as indicated at 600. The storage system may have SLOs (service level objectives) that specify aspects of data access performance that are expected to be met or necessary for some level of host application performance. For example and without limitation an average TOPS value may be specified. If there is sufficient free capacity in the memory 208 for IOs without compromising SLOs as determined at 602 then data (data, dependent data and transformed data) will continue to be held in the memory as indicated at 604. If sufficient space is unavailable in the memory then a determination is made as to whether there is sufficient free capacity in non-volatile storage 424 such as flash, SAS, SATA or FC drives for example and without limitation as indicated at 606. For example, if there is sufficient free capacity in flash then the data is pushed to flash as indicated at 608. If there is insufficient free capacity in flash then the data is pushed to the highest performing tier where sufficient free capacity is available as indicated at 610. Further, the data movement engine is prompted to promote the data when sufficient free capacity becomes available in the memory or a higher performing storage tier as indicated at 612.

Figure 7:
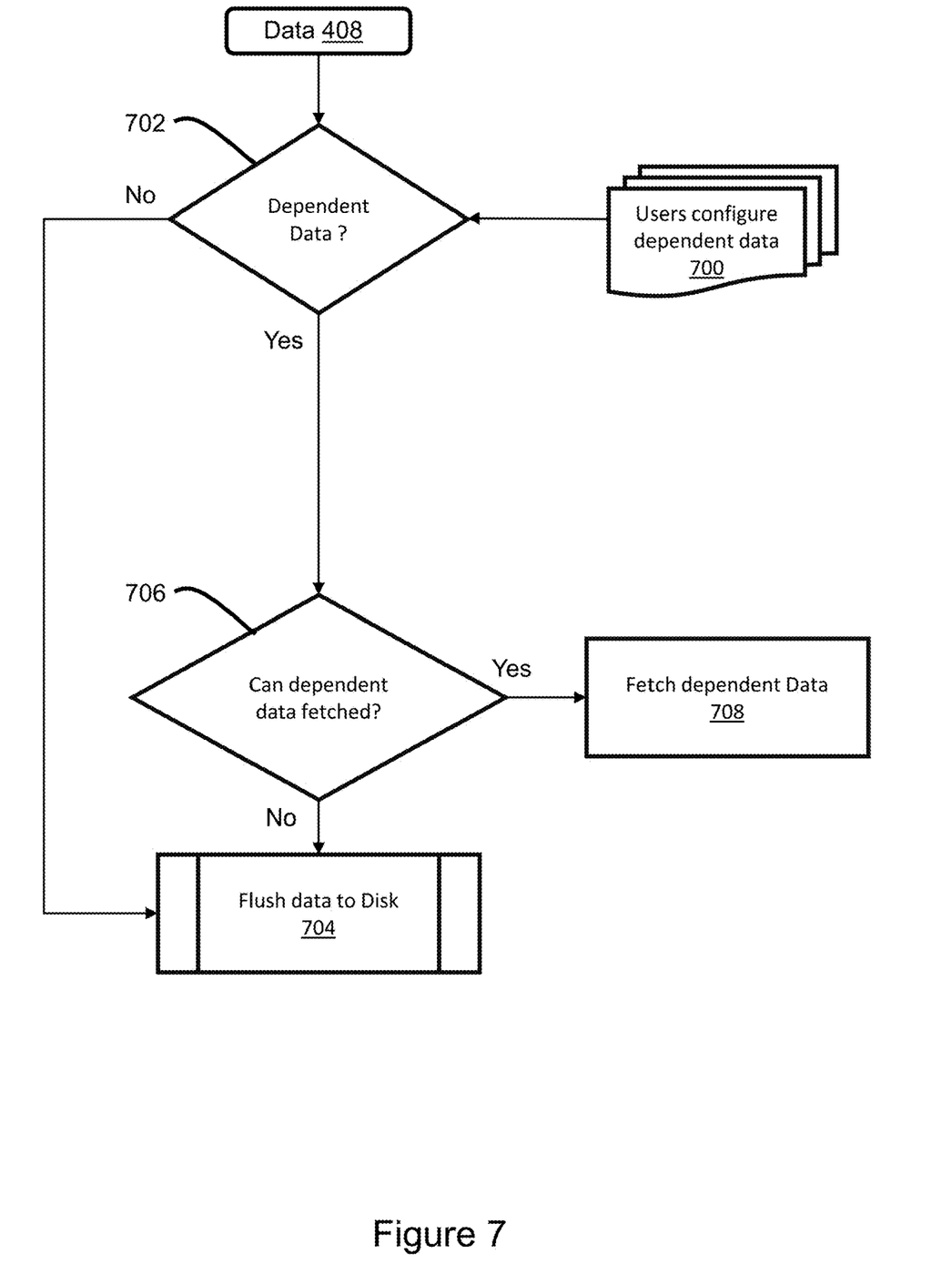

FIG. 7 illustrates actions that may be taken based on whether the related (dependent) data is available. As indicated above, the analytics engine determines whether there is any dependent data that is related to data 408. The relationship between data and related data that is dependent thereon may be discovered by the analytics engine or configured by a user as indicated at 700. If dependent data does not exist as determined at 702 then data 408 is de-staged normally, e.g. flushed to disk as indicated at 704. If dependent data exists then a determination is made as to whether the dependent data can be fetched as indicated at 706. If the dependent data can be fetched then it is fetched as indicated at 708. If the dependent data cannot be fetched then data 408 is de-staged normally, e.g. flushed to disk as indicated at 704.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
   a storage cluster of a plurality of storage clusters associated with federated tiered storage, comprising:
   at least one computing node that processes input-output operations, the computing node comprising a processor and a non-transitory volatile memory;
   a plurality of non-volatile data storage devices on which federated tiered storage data is stored; and
   a data transform component running on the computing node, the data transform component comprising program code that identifies a structure of federated tiered storage data that is copied from the data storage drives into the memory to process an input-output operation and, based on the structure, locates dependent federated tiered storage data in a remote storage cluster of the plurality of storage clusters and causes the located dependent federated tiered storage data to be copied from the remote storage cluster into the memory.

2. The apparatus of claim 1 wherein the data transform component comprises a database of data structures.

3. The apparatus of claim 2 wherein the data transform component comprises program code that locates dependent data in the storage devices for the data structures in the database as indicated by a policy.

4. The apparatus of claim 1 wherein the data transform component delays destaging of the data from the memory while the dependent data is located in the memory and prompts destaging of the data to the data storage devices responsive to a determination that the dependent data cannot be fetched.

5. The apparatus of claim 1 wherein the data transform component transforms the dependent data and combines the transformed dependent data with other data to provide analytics-ready data.

6. The apparatus of claim 1 wherein the data transform component provides a hint to prompt promotion of the dependent data to a higher performing tier of storage.

7. The apparatus of claim 1 wherein the data transform component prevents copying of the dependent data into the memory responsive to a determination that doing so would cause a failure to achieve service level objectives.

8. The apparatus of claim 1 wherein the data transform component copies the dependent data to the non-volatile data storage devices responsive to a determination that free capacity in the memory is insufficient.

9. The apparatus of claim 1 wherein the data transform component uses data relationships to prepare dependent data for access in advance of an input-output operation associated with that dependent data.

10. The apparatus of claim 1 wherein the located dependent data is copied into the memory responsive to a determination that doing so will not compromise achievement of service level objectives.

11. The apparatus of claim 1 comprising user-configurable policies that indicate data of interest and identify dependent data.

12. A method comprising:
   in a storage cluster of a plurality of storage clusters associated with federated tiered storage, the storage cluster comprising a plurality of non-volatile data storage devices on which federated tiered storage data is stored and at least one computing node that processes input-output operations, the computing node comprising a processor and a volatile memory:
   identifying a structure of federated tiered storage data that is copied from the data storage drives into the memory to process an input-output operation;
   based on the structure, locating dependent federated tiered storage data in a remote storage cluster of the plurality of storage clusters; and
   copying the located dependent federated tiered storage data from the remote storage cluster into the memory.

13. The method of claim 12 comprising using a database of data structures to identify the structure of the data.

14. The method of claim 13 comprising locating the dependent data and copying it to cache from external storage devices for the data structures in the database as indicated by a policy.

15. The method of claim 12 comprising delaying destaging of the data while the dependent data is located and destaging to the data storage devices responsive to a determination that the dependent data cannot be fetched.

16. The method of claim 12 comprising transforming the dependent data.

17. The method of claim 12 comprising providing a hint to prompt promotion of the dependent data to a higher performing tier of storage.

18. The method of claim 12 comprising preventing copying of the dependent data into the memory responsive to a determination that doing so would cause a failure to achieve service level objectives.

19. The method of claim 12 comprising copying the dependent data to the non-volatile data storage devices responsive to a determination that free capacity in the memory is insufficient.

* * * * *